United States Patent
Bolotov et al.

(10) Patent No.: US 11,269,786 B2
(45) Date of Patent: Mar. 8, 2022

(54) MEMORY DATA PROTECTION BASED ON AUTHENTICATED ENCRYPTION

(71) Applicant: Intel Corporation, Santa Clara, CA (US)

(72) Inventors: Anatoli Bolotov, San Jose, CA (US); Mikhail Grinchuk, San Jose, CA (US); David M. Durham, Beaverton, OR (US); Patrick Fleming, Slatt Wolfhill (IE)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 16/045,393

(22) Filed: Jul. 25, 2018

(65) Prior Publication Data

US 2019/0050347 A1 Feb. 14, 2019

(51) Int. Cl.
*G06F 21/00* (2013.01)
*G06F 12/14* (2006.01)
*G06F 21/44* (2013.01)
*G06F 21/78* (2013.01)

(52) U.S. Cl.
CPC .......... *G06F 12/1408* (2013.01); *G06F 21/44* (2013.01); *G06F 21/78* (2013.01); *G06F 2212/1052* (2013.01)

(58) Field of Classification Search
CPC ...... G06F 12/1408; G06F 21/44; G06F 21/78; G06F 2212/1052
See application file for complete search history.

(56) References Cited

U.S. PATENT DOCUMENTS

| | | | |
|---|---|---|---|
| 10,275,365 B1* | 4/2019 | Gonion | H04L 9/3247 |
| 10,979,403 B1* | 4/2021 | Mutescu | G06F 21/44 |
| 2016/0063279 A1* | 3/2016 | Hars | G06F 12/1408 713/190 |
| 2016/0283750 A1* | 9/2016 | Durham | G06F 21/79 |
| 2017/0103192 A1* | 4/2017 | Hussey | G06F 8/30 |
| 2017/0257383 A1* | 9/2017 | Ficarra | G06F 21/44 |
| 2018/0300261 A1* | 10/2018 | Narayanasamy | G06F 13/4282 |
| 2019/0087566 A1* | 3/2019 | Hosie | G06F 21/44 |
| 2019/0342090 A1* | 11/2019 | Pisasale | H04L 9/0662 |

OTHER PUBLICATIONS

Shay Gueron, "A Memory Encryption Engine Suitable for General Purpose Processors", Cryptology ePrint Archive, Feb. 25, 2016, 14 pages, Report 2016/204.
Zhaojun Lu et al., "Efficient Off-Chip Memory Protection Mechanism for Embedded Computing Systems Using AES-GCM", Conference Paper, 14th International Conference on CAD/Graphics, 2015, pp. 236-237.

* cited by examiner

*Primary Examiner* — Andrew J Steinle
(74) *Attorney, Agent, or Firm* — Jordan IP Law, LLC

(57) ABSTRACT

Systems, apparatus, and/or methods to provide memory data protection. In one example, authenticated encryption may be enhanced via a modification to an authentication code that is associated with encrypted data. The authentication code may be modified, for example, with a nonce value generated for a particular write to memory Decrypted data, generated from the encrypted data, may then be validated based on a modified authentication code. Moreover, data freshness control for data stored in the memory may be provided based on iterative authentication and re-encryption. In addition, a counter used to provide a nonce value may be managed to reduce a size of the counter and/or a growth of the counter.

25 Claims, 8 Drawing Sheets

MEMORY DATA PROTECTION BASED ON AUTHENTICATED ENCRYPTION

TECHNICAL FIELD

Embodiments generally relate to memory data protection. More particularly, embodiments relate to memory data protection based on authenticated encryption.

BACKGROUND

An embedded system may generally include a system on chip (SoC) and off-chip memory. For unprotected systems, off-chip memory and a bus (e.g., between the SoC and the off-chip memory) are venerable to security attacks such as bus probing and/or memory tampering. For example, an adversary may attack an embedded system via spoofing (e.g., replacement of an existing memory block at a memory address with forged data), via splicing (e.g., replacement of a memory block at a memory address with a memory block at another memory address), via replay (e.g., a memory block at a memory address is recorded at a moment in time and inserted later at the same address at a later moment in time), etc. Accordingly, there may be an increase of security attacks (invasive and non-invasive) at off-chip memory that sores sensitive data outside of a processor trusted execution environment (TEE) such as at dynamic random access memory (DRAM) on a client side, at cloud storage or a datacenter on a service side, etc.

The integrity of memory data may therefore generally relate to guarding against improper modification or destruction of memory data to ensure reads with confidence of accuracy, reliability, and/or that memory data has not been changed or tampered with by an unauthorized malicious party. Traditional hash-tree technologies for memory integrity may exhibit performance degradation and/or relatively high storage overhead based on the movement of integrity-related information off chip while storing a small fraction (e.g., a root) inside of a memory controller (e.g., static random access memory/SRAM). Meanwhile, other traditional technologies for memory integrity may be unfeasible based on SRAM capacity (e.g., KBs) to protect off-chip memory with relatively larger capacity (e.g., TBs) if all of the off-chip memory data is to be protected. Thus, there is considerable room for improvement to provide memory protection.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
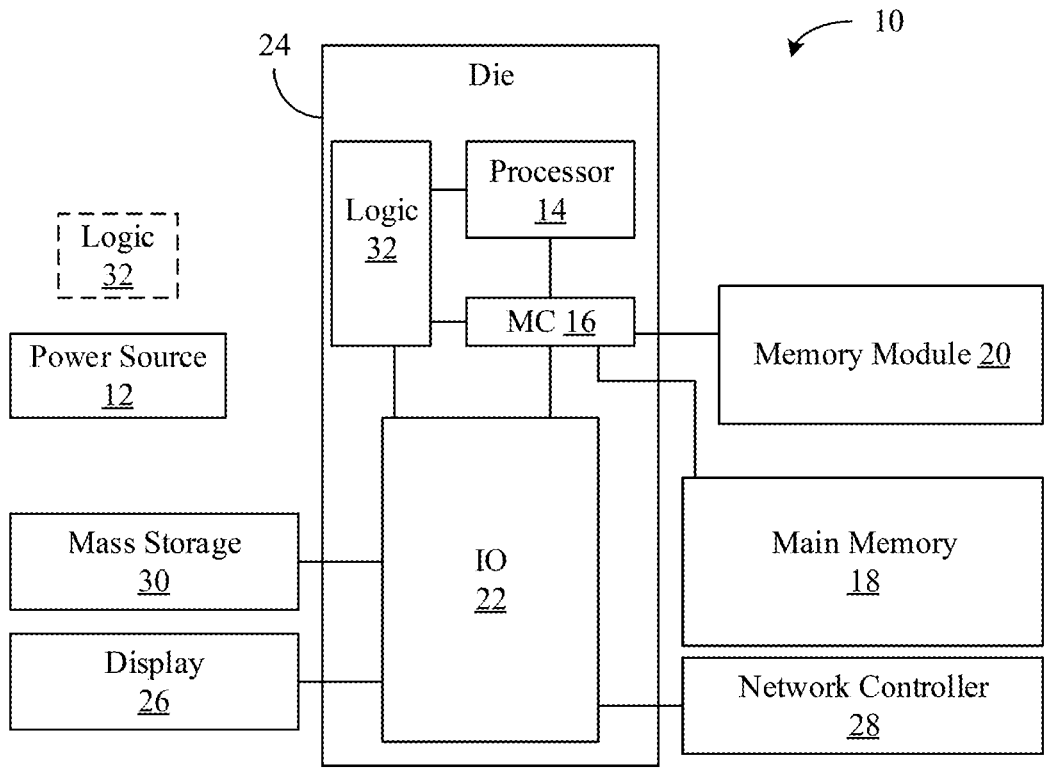
FIG. 1 is a block diagram of an example of an electronic processing system according to an embodiment.

FIG. 1 shows an example of an electronic processing system 10 to provide memory data protection according to an embodiment. The system 10 may generally be part of an electronic device/platform having computing functionality (e.g., datacenter, cloud server, personal digital assistant/PDA, notebook computer, tablet computer, laptop, etc.), imaging functionality (e.g., camera, projector, etc.), media playing functionality (e.g., smart television/TV, gaming platform, smart phone, etc.), wearable functionality (e.g., watch, eyewear, headwear, footwear, jewelry, etc.), vehicular functionality (e.g., car, truck, motorcycle, etc.), and so on. The system 10 may also include communications functionality for a wide variety of purposes including cellular telephone (e.g., Wideband Code Division Multiple Access (W-CDMA), Universal Mobile Telecommunications System (UMTS), CDMA2000 (IS-856/IS-2000), etc.), Wireless Fidelity (WiFi, e.g., IEEE 802.11-2007, Wireless Local Area Network (LAN) Medium Access Control (MAC) and Physical Layer (PHY) Specifications, etc.), Light Fidelity (LiFi, e.g., IEEE 802.15-7, Wireless LAN MAC and PHY, etc.), Long Term Evolution (LTE, e.g., 4G, 5G, etc.), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), NFC (Near Field Communication, ECMA-340, ISO/IEC 18092), and/or other radio frequency (RF) purposes.

The system 10 includes a power source 12. The system 10 also includes a processor 14, such as a micro-processor, an embedded processor, a digital signal processor (DSP), a central processing unit (CPU), a graphical processing unit (GPU), a visual processing unit (VPU), a network processor, hardware that executes code to implement one or more aspects of the technology described herein, etc. For example, the processor 14 may include one or more cores to execute operations (e.g., a single-threaded core, a multi-threaded core including more than one hardware thread context (or "logical processor") per core, etc.). The processor 14 may also be communicatively coupled to internal storage such as a cache (e.g., instruction cache, data cache, single level cache, multilevel cache, shared cache, strictly inclusive cache, exclusive cache, etc.), etc.

In the illustrated example, the processor 14 is communicatively coupled to a memory controller 16 that controls access to a memory device. The illustrated memory controller 16 is communicatively coupled to main memory 18. The main memory 18 may include, for example, random access memory (RAM), read-only memory (ROM) (e.g., programmable read-only memory (PROM), erasable PROM (EPROM), electrically EPROM (EEPROM), etc.), phase change memory (PCM), a three dimensional cross-point memory device (3DXP), etc. The memory controller 16 is also communicatively coupled to memory module 20. The memory module 20 may include, for example, DRAM configured as one or more memory modules such as dual inline memory modules (DIMMs), small outline DIMMs (SODIMMs), etc. Thus, the memory controller 16 may control direct memory access (DMA), remote DMA (RDMA), and so on.

The system 10 also includes an input output (TO) module 22 implemented together with the processor 14 and the memory controller 16 on a semiconductor die 24 as an SoC, wherein the IO module 22 functions as a host device and may communicate with, for example, a display 26 (e.g., touch screen, liquid crystal display/LCD, light emitting diode/LED display), a network controller 28 (e.g., Ethernet controller, etc.), and mass storage 30 (e.g., hard disk drive/ HDD, optical disk, flash memory, etc.). Thus, the memory controller 16 controls off-chip memory in the illustrated example such as the main memory 18, the memory module 20, and the mass storage 30. The memory controller 16 may also control on-chip memory such as SRAM, cache memory, etc.

The system 10 further includes logic 32 to protect memory data via memory security, data freshness control, etc. The logic 32 is communicatively coupled to the processor 14, the memory controller 16, and the IO module 22 on the semiconductor die 24. Alternatively, the logic 32 may be implemented elsewhere in the system 10 and/or outside of the system 10. The logic 32 enhances authentication encryption (AE) via, e.g., a modified authentication code (e.g., a modified message authentication code (MAC), a modified authentication tag, a modified integrity check value (ICV), etc.) based on a value that is generated specifically for a particular write of data to memory. For example, a new value is generated each time a write of data is to be made to memory and the new value is allocated to a current write. The logic 32 also provides data freshness control for data stored in memory via, e.g., iterative authentication and re-encryption based on a timestamp (TS) value. The logic 32 also minimizes a counter size and/or a counter growth via, e.g., prefix coding, arrays of counters, buffering, and/or counter reset. Thus, the logic 32 provides confidentiality, integrity, and/or authenticity assurances on stored data with lower relative memory overhead, bandwidth, latency, power consumption, etc.

Figure 2:
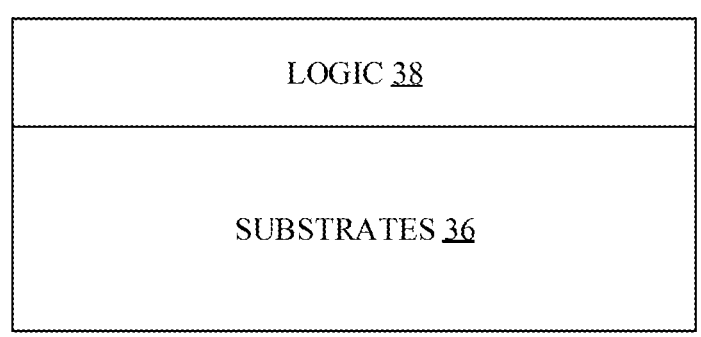
FIG. 2 is a block diagram of an example of a semiconductor package apparatus according to an embodiment.

Turning now to FIG. 2, an embodiment of a semiconductor package apparatus 34 includes one or more substrates 36 (e.g., silicon, sapphire, gallium arsenide) and logic 38 (e.g., transistor array and other integrated circuit/IC components) coupled to the substrates 36. The apparatus 34 may be implemented in the system 10 (FIG. 1), discussed above. Additionally, the logic 38 may be the same as the logic 32 (FIG. 1), already discussed, to provide memory security, data freshness control, and so on.

Embodiments of the logic 38, and other components of the apparatus 34, may be implemented in hardware, software, or any combination thereof including at least a partial implementation in hardware. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS), or transistor-transistor logic (TTL) technology, or any combination thereof. In one example, the logic 38 may include transistor channel regions that are positioned (e.g., embedded) within the substrates 36. Thus, the interface between the logic 38 and the substrates 36 may not be an abrupt junction. The logic 38 may also be considered to include an epitaxial layer that is grown on an initial wafer of the substrates 36.

Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3:
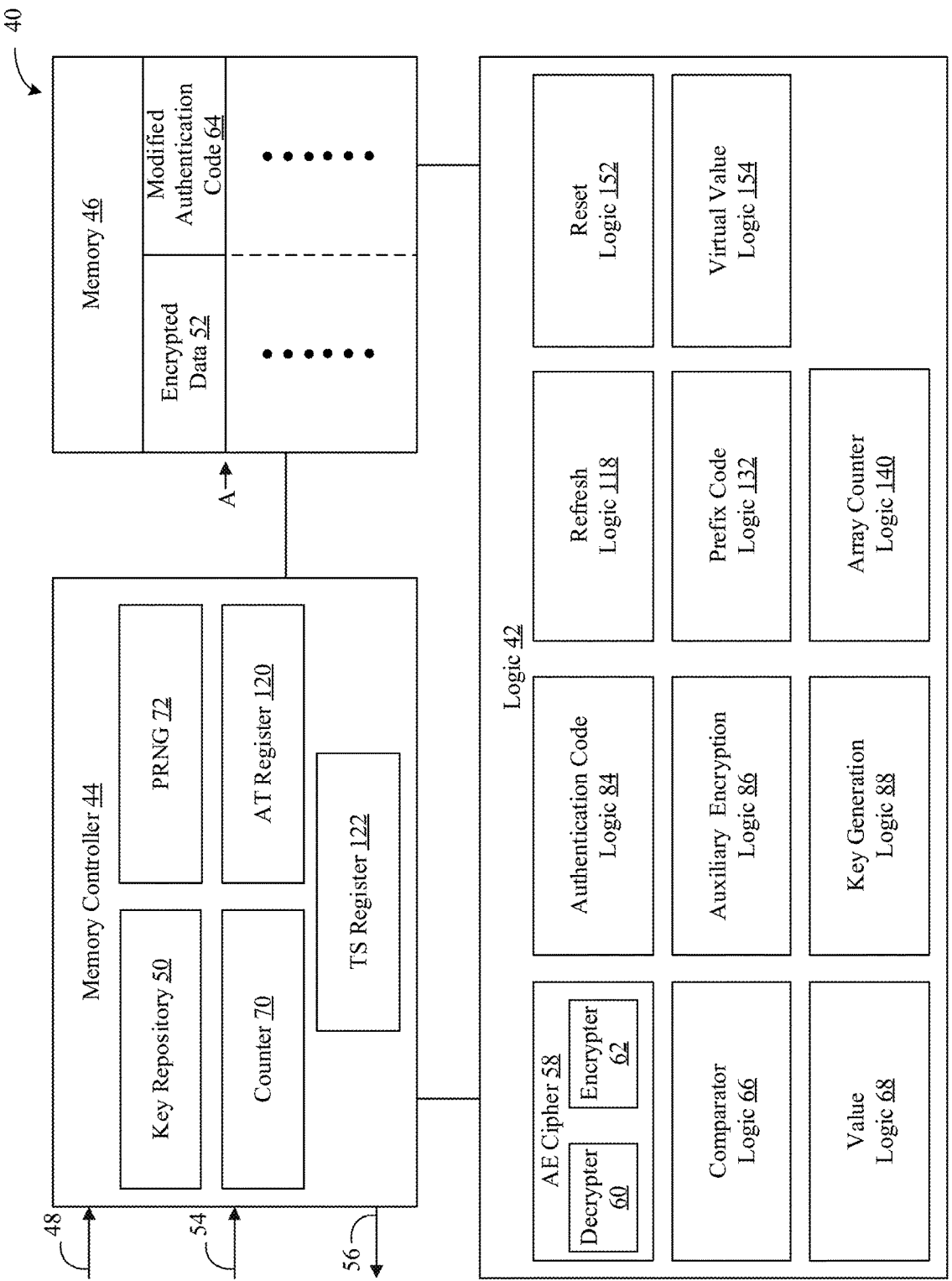
FIG. 3 is a block diagram of an example of another electronic processing system according to an embodiment.

FIG. 3 shows an electronic processing system 40 to provide memory data protection according to an embodiment. The system 40 may be the same as the system 10 (FIG. 1), already discussed. In the illustrated example, the system 40 includes logic 42 communicatively coupled to a memory controller 44 that receives a request to access memory 46 via a request line 48. In one example, the logic 42 is the same as the logic 32 (FIG. 1) and/or the logic 38 (FIG. 2), discussed above. As shown in FIG. 3, data in the request may vary based on a request type. For example, data in a request may include a memory address, a key identifier (K_id) for a key (e.g., a key from a security authority (SA)), a SA identifier (SA_id), etc. Thus, a key identifier in a write request issued over the request line 48 might be used to locate a private key stored in a key repository 50 that is used to generate encrypted data 52 (e.g., ciphertext) from unencrypted data (e.g., original plaintext) input over a data input line 54. In addition, a read request may correspond to a read of the encrypted data 52 at an address (A), wherein the encrypted data 52 is read, decrypted (e.g., decrypted plaintext), and output on a data output line 56.

Accordingly, an AE cipher 58 generates ciphertext (e.g., an unreadable result from encryption) from plaintext and/or generates decrypted plaintext from ciphertext. Generally, plaintext may include data that is subject to encoding in a special format (e.g., hypertext transfer markup language (HTML), rich text format (RTF), etc.) and read by an appropriate program (e.g., word processor, text editor, etc.) without decryption. Plaintext may be data that is encodable in any format, such as audio/video data (e.g., moving picture experts group (MPEG) data, etc.), image data (e.g., joint photographic experts group (JPEG) data, etc.), financial data (e.g., automatic transfer machine (ATM) transaction data, etc.), etc. Plaintext may also include program data such as a part of a program, an operating system (OS), an application, a virtual machine, etc. Plaintext may also include instruction data such as an opcode, an operand, and so on.

The AE cipher 58 may implement any AE mode of operation including, for example, AE with associated data (AEAD_CHACHA20_POLY1305, etc.), Encrypt-then-MAC (EtM), Encrypt-and-MAC (E&M), MAC-then-Encrypt (MtE), Offset Codebook Mode (OCB), Counter with Cipher Block Chaining (CBC) MAC (CCM), Encrypt-then-Authenticate-then-Translate (EAX), Sponge functions (e.g., in duplex mode, etc.), Advanced Encryption Standard (AES) in Galois/Counter Mode (GCM), etc. In the illustrated example, a decrypter 60 implements a mode to decrypt the encrypted data 52 stored at the address A that is a same mode implemented by an encrypter 62 to encrypt data intended for the address A provided over the data input line 54. The decrypter 60 may also calculate a new authentication code for the encrypted data 52 on decryption that is compared to a modified authentication code 64 generated for the encrypted data 52 on encryption. The modified authentication code 64 is stored at the address A to associate the modified authentication code 64 with the encrypted data 52. The modified authentication code 64 may alternatively be stored at another address of the memory 46 or at another memory device, wherein the association with the modified authentication code 64 may be made via a data structure (e.g., a table, etc.).

When comparator logic 66 determines that a match condition exists between an authentication code calculated on decryption and the modified authentication code 64 generated on encryption, the decrypted plaintext from the decrypter 60 is valid and/or the encrypted data 52 from the memory 46 is authenticated. When a mismatch occurs, a security action may automatically be implemented such as isolating the data at the memory address A, sending an alert to an administrator device, reverting back to last known valid data at the memory address A, etc. Notably, the modified authentication code 64 may be based on a value generated specifically for a corresponding write to memory (e.g., a new value generated specifically for a new write of data to memory).

Accordingly, value logic 68 identifies a value generated for a write of data to the memory 46. The value may be a nonce value that represents a particular value associated with only one particular write to memory. For example, a counter value may be generated in a counter 70 that increments its values for each write to memory. Thus, the value logic 68 may identify a first counter value from the counter 70 generated for a first write request, a second counter value from the counter 70 generated for a second write request after the first write request, etc. The counter 70 may include a plurality of counters, discussed in detail below. Generally, considerations for a deterministic counter value may include less relative number of bits for a same likelihood of collision, less area to implement and handle, and/or no random number source (e.g., a seed value).

The value logic 68 may also identify a pseudorandom value from pseudorandom number generator (PRNG) 72 that generates a new value for each write to memory. The PRNG 72 may include software such as a /dev/random and/or /dev/urandom generator, a yarrow-based generator, an entropy gathering daemon (EGD) generator, etc. The PRNG 72 may also include hardware such as Intel® Digital Random Number Generator (DRNG), a shift register (e.g., a linear feedback shift register, etc.), etc. Thus, the value logic 68 may identify a first pseudorandom number from the PRNG 72 generated for a first write request, a second pseudorandom number from the PRNG 72 generated for a second write request made after the first write request, etc. Generally, considerations for a pseudorandom number may include no storage in persistent memory when power is off, easy control, instant resume after power is off and on, etc.

Additionally, the value logic 68 generates an initialization value for the AE cipher 58 such as, for example, an initialization vector (IV), an initial state (IS), and so on. Generally, AE ciphers (e.g., AES-GCM, AEAD_CHACHA20_POLY1305, counter modes, etc.) may employ a different initialization value for each cache line (CL) that is encrypted. Thus, the value logic 68 may ensure that a different IV and/or IS is utilized for each invocation with a same key and for a given address via a nonce value (e.g., a counter value, a pseudorandom number, etc.). Moreover, as discussed in detail below, the value logic 68 may organize a wave rotation process by providing an aging mechanism for the IV and/or IS, and/or allow distinguishing between stale (e.g., old) and fresh (e.g., newly validated and stored) regions of memory via a most recent TS value.

Figure 4A:
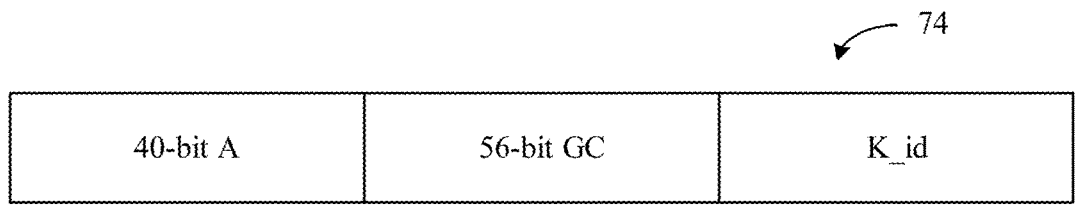
FIGS. 4A to 4C are block diagrams of examples of initialization values according to an embodiment.

As shown in FIG. 4A, an IV 74 may be constructed for a read and/or a write operation at a given address (e.g., A). The IV 74 may be, for example, a 96-bit value to initialize AES-GCM. In the illustrated example, the IV 74 is based on an address value (e.g., 40-bit address A), a counter value (e.g., 56-bit global counter value (GC)), and a K_id. The counter value may be identified from a counter (e.g., incremented after a counter value is used, after each write operation for a CL no matter at what address in memory writing of a CL was performed) for a write operation and inserted into the IV 74. The counter value may also be included in a modified authentication code for extraction on decryption. Thus, the IV 74 may be newly constructed based on an extracted counter value from a stored modified authentication code and used to decrypt associated stored ciphertext retrieved at the given address (e.g., A). In one example where a K_id or a SA_id is used, only 9 least significant bits may be used to process up to a 4 KB CL written to memory. Thus, an extension of a user-defined portion of the IV 74 (e.g., for up to a length of 119 bits, etc.) may be used to allow remaining bits (e.g., up to 23 bits, etc.) for an optional IV field to write a K_id and/or a SA_id (if used and/or desired).

Figure 4B:
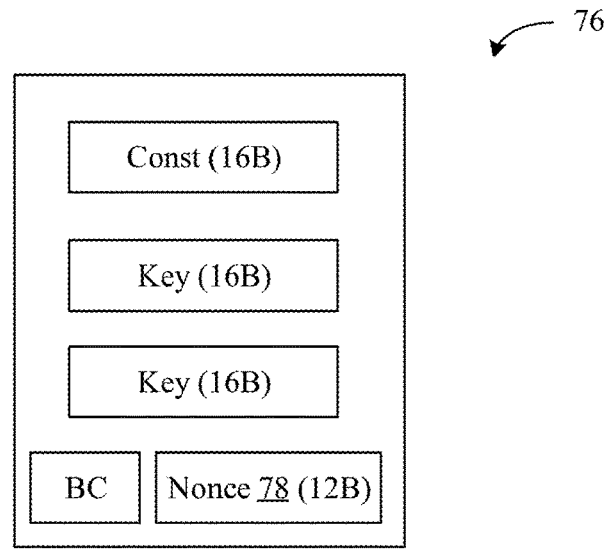
Figure 4C:
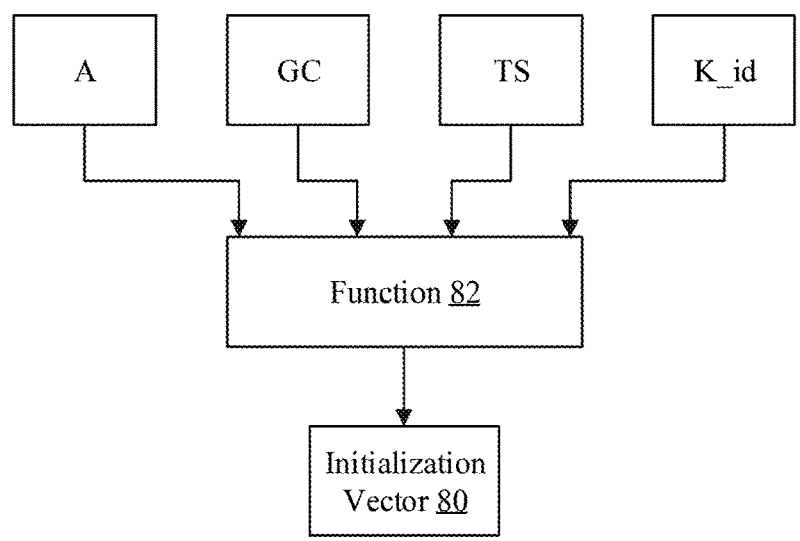

As shows in FIG. 4B, an IS 76 may be constructed to initialize AES-GCM, AEAD_CHACHA20_POLY1305, and so on. In the illustrated example, a nonce 78 may be constructed in substantially the same way that the IV 74 (FIG. 4A) is constructed. In one example, 25 most significant bits may be borrowed from a 32-bit block counter (e.g., block size of 64B, process 64 blocks to complete 4 KB CL processing, etc.) when an optional K_id is needed and/or desired. As shown in FIG. 4C, an IV 80 may be constructed from one or more compressed values. For example, a 96-bit IV may be constructed to initialize AES-GCM for a read operation and/or a write operation at a given address (e.g., A) by compressing a concatenation of the address A, a counter value (e.g., GC), a most recent TS value, and a K_id (or a SA_id). In this regard, a one-way compression/hashing function 82 may be utilized based on relatively low latency to minimize overhead in a read operation and/or a write operation.

Referring back to FIG. 3, authentication code logic 84 modifies an authentication code calculated by the encrypter 62 (e.g., an unmodified or original authentication code) on encryption of the unencrypted data (e.g., 4 KB CL) received on the data input line 54. The authentication code logic 84 may concatenate a nonce value with the authentication code calculated on encryption to generate the modified authentication code 64. In one example, a sum of a first field for a nonce value and a second field for an authentication value in the modified authentication code 64 is set to a size of the authentication code calculated on encryption (e.g., 128-bits, etc.). In addition, field sizes may be selected to provide a threshold or desired amount of AE strength. A size of the second field may be selected to be long enough to make random searches for tag matching any given data unfeasible (spoofing attacks). An overall size of the modified authentication code 64 may be selected to be long enough to prevent re-using same security parameters for multiple re-writings at the same address (replay attacks).

The authentication code logic 84 may also determine a size of one field from a size of another other field. For example, the authentication code logic 84 may determine that the size of a first field is N bits (where N=1, 2, . . . ) and subtract that size from an overall size to determine the size of a second field. As discussed in detail below, the authentication code logic 84 may utilize prefix codes to simply this determination. The authentication code logic 84 may also truncate (e.g., at most significant bits, at least significant bits, etc.) the authentication code calculated on encryption to a size of a second field to form a truncated authentication code. The authentication code logic 84 may then concatenate the truncated authentication code with the nonce value to generate the modified authentication code 64. Notably, a K_id and/or a SA_id may also be embedded into the modified authentication code 64 to identify an SA and/or a private key for decryption when reading back the memory data. Considerations for an unencrypted modified authentication code may include relative simplicity, no extra latency (e.g., no additional encryption/decryption operation), less read overhead, and so on.

Additionally, auxiliary encryption logic 86 encrypts the modified authentication code 64 with a key (e.g., 256-bit key) to generate an encrypted modified authentication code. The auxiliary encryption logic 86 may encrypt the modified authentication code 64 before the memory controller 44 stores the modified authentication code 64 in the memory 46. The auxiliary encryption logic 86 may also utilize a relatively low latency cipher (e.g., Simon block cipher, etc.) to encrypt/decrypt the modified authentication code 64. In addition, the auxiliary encryption logic 86 may utilize a fixed key and/or an AE key (e.g., a rotation key) to encrypt/decrypt the modified authentication code 64. Considerations for an encrypted modified authentication code may include security (e.g., trajectory of writing not revealed), key refreshing and rotating wave handling (e.g., only authentication code re-encrypted with a new rotation key rather than re-encrypting an entire CL and re-computing a authentication code), etc.

In one example, key generation logic 88 generates an AE key to encrypt/decrypt data. The key generation logic 88 may, for example, utilize a compression function to generate the AE key based on an address (e.g., A), a key (e.g., private key (K)), and/or a most recent TS value. Notably, utilizing a TS value may refresh the modified authentication code 64, an initialization value, etc. Moreover, encrypting a composite authentication code may hide information about values such as nonce values (e.g., global counter values, etc.). In addition, utilizing an AE key may provide anti-replay protection. In one example, the key generation logic 88 may adjust an on-the-fly AE key (Ka) for each address written to. The key generation logic 88 may, for example, utilize a relatively lightweight one-way compression function to generate Ka as a function of the key K and the address A (e.g., Ka=F(K,A). Where data refresh is implemented via a TS value, Ka may be a function of TS (e.g., Ka=F(K,A,TS)). Thus, compromising a single key Ka does not break other keys or compromise entire memory.

Figure 5A:
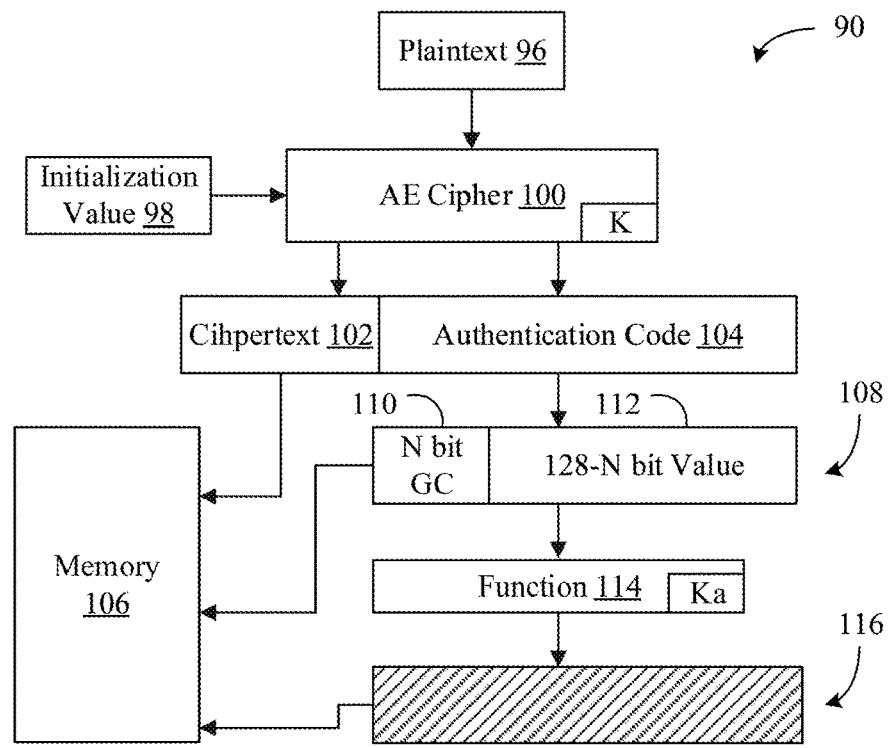
FIGS. 5A to 5B are block diagrams of an example of authenticated encryption according to an embodiment.
Figure 5B:
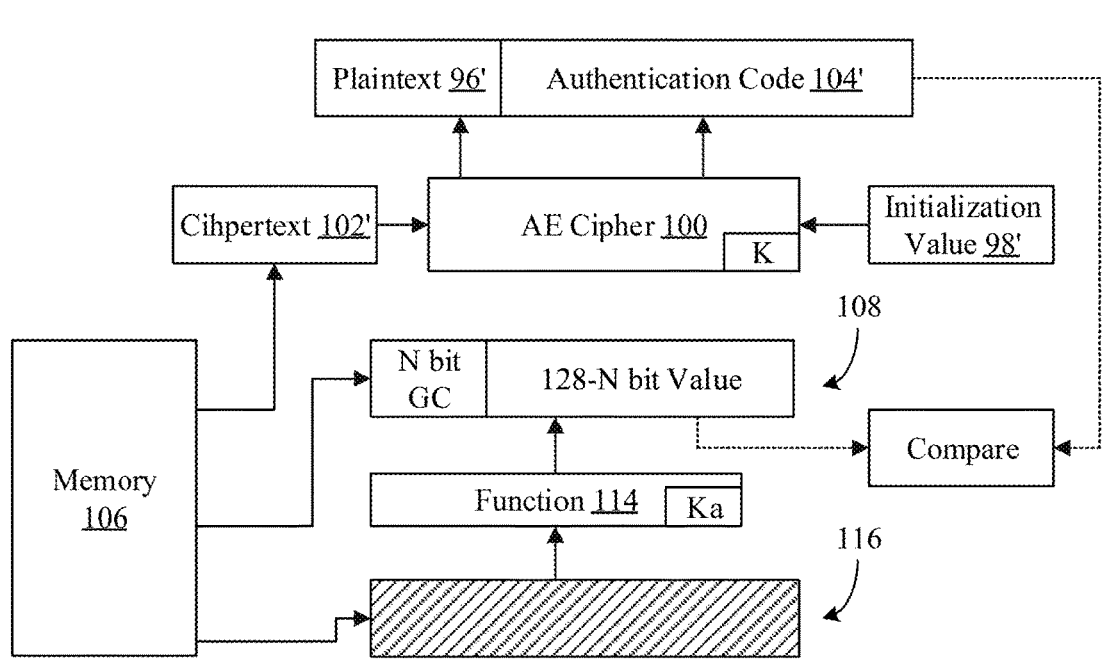

As shown in FIGS. 5A to 5B, authenticated encryption 90 including encryption 92 and decryption 94 is shown according to an embodiment. In the illustrated example, on a write request, an input CL may be sent via a data in line and encrypted whereas on a read request encrypted data and an associated modified authentication code are retrieved from memory. The encrypted data is decrypted and validated using the modified authentication code. The resulting CL (if check passed) is returned via a data out line and a requester is informed of check success and/or failure. As shown in FIG. 5A, plaintext 96 and an initialization value 98 (e.g., an initialization vector) is input with a key (e.g., private key K) into an AE cipher 100 to generate ciphertext 102 and an authentication code 104 (e.g., 128-bit authentication tag) during a write operation of the plaintext 96 to memory 106. When the AE cipher 100 implements AES-GCM to encrypt the initialization value 98 with the key K, the AE cipher 100 XOR's that result with the plaintext 96 to form the ciphertext 102. The ciphertext 102 is then ran through a multiplication pipeline (e.g., GF($2^{128}$), etc.) to calculate the authentication code 104.

The authentication code 104 is truncated and concatenated with a nonce value, used to generate the initialization value 98, that results in a modified authentication code 108 including a first field 110 for the nonce value (e.g., a general counter value, N bit (GC)) and a second field 112 for an authentication value (e.g., 128 bit-N bit truncated tag). The modified authentication code 108 may be encrypted using a key (e.g., fixed key, rotation key, Ka, etc.) via a compression/decompression function 114 to generate an encrypted modified authentication code 116. The modified authentication code 108 and/or the encrypted modified authentication code 116 is stored in the memory 106, which is the same memory device used to store the ciphertext 102. In one example, redundant memory for error correction codes may be used to store the modified authentication code 108 and/or the encrypted modified authentication code 116. In this regard, the redundant memory may be written in parallel with the ciphertext 102 and/or in a second write to memory. Similarly, reads may be performed in parallel or in sequence.

As shown in FIG. 5B, ciphertext 102' (prime symbol means encrypted data may be unchanged or valid and/or maliciously changed or corrupt) stored at the given address (e.g., A) is read from the memory 106 together with the corresponding modified authentication code 108 and/or the encrypted modified authentication code 116. The encrypted modified authentication code 116 (if used) is decrypted via the compression/decompression function 114 and the nonce value GC is extracted from the first field 110 of the modified authentication code 108 to generate an initialization value 98' (prime symbol means value may be the same or different than the value used to initialize encryption). The initialization value 98' is input into the AE cipher 100 to generate plaintext 96' and to calculate a new authentication code 104' (prime symbols mean value or code may be the same or different than the respective value or code generated on encryption). When the AE cipher 110 implements AES-GCM to decrypt the ciphertext 102', the initialization value 98' is processed with the key K and the result is XOR'ed with the ciphertext 102' to generate the plaintext 96'.

Additionally, the ciphertext 102' is ran through the multiplication pipeline to calculate the authentication code 104' which is then compared with the modified authentication code 108 to validate the plaintext 96' and/or to authenticate the ciphertext 102'. For example, a comparison may be made on a per-bit basis once the authentication code 104' and the modified authentication code 108 are lined up at related bit positions. In one example where the authentication code 104 is truncated at most significant bits of a 128-bit authentication code to generate the modified authentication code 108 (e.g., to accommodate an N-bit nonce value by forming an 128-N bit portion), the bits in the second field 112 of the modified authentication code 108 may be lined up with the related least significant bits in the authentication code 104' to validate the plaintext 96'.

Referring back to FIG. 3, refresh logic 118 ensures that data read from memory at an address is a latest (e.g., most fresh) data written at that address (e.g., data freshness). Data freshness and/or anti-replay protection may detect when a portion of memory (e.g., containing important updates, etc.) is replaced with old contents legally written in the past by a memory controller. Disablement (e.g., temporarily) of a write enable signal at an address (e.g., address "A") by a malicious user may also be detected, which might cause a current write operation to be ignored and data at the address to remain unchanged (e.g., when a security parameter is being written, bank account information is being updated, etc.). The refresh logic 118 may employ relatively light weight anti-replay countermeasures that provide minimized impact on a hardware implementation of a memory controller, may not require extra bits to be additionally stored, may not require additional read/write operations to read or write user data, and so on. Thus, unlike in traditional integrity trees that require multiples of extra reads/writes for each read/write request, a memory controller may not need to perform additional reads (e.g., 2-5) from different locations when reading data at an address.

Generally, the refresh logic 118 may refresh data in front of a moving refresh wave that runs in the background continuously traversing memory (from a first address in a memory address space to a last address in the memory address space) at a pre-defined pace. In this regard, granularity of time (T) may be determined by a time needed for a wave to pass over all of a memory space. Thus, a rotating wave may provide timing/clock to distinguish between old memory records and new memory records (e.g., fresh data). In the illustrated example, the refresh logic 118 may refresh an initialization value (e.g., an initialization vector) in front of a moving refresh wave and allow for a corresponding CL to be re-encrypted based on the refreshed initialization value. Thus, the encrypted data 52 and/or the modified authentication code 64 may be refreshed based on a refreshed initialization value. In one example, the refresh logic 118 may generate a random value (e.g., a rotation key) on each pass of a moving refresh wave and use it for re-encryption of the modified authentication code. In another example, a TS value may be used to refresh encrypted data by rolling a TS value into an IV/IS (e.g., FIG. 4C).

For example, the refresh logic 118 accesses an address threshold (AT) register 120 to determine that the address A is an AT, indicating that the address A is at the front of a refresh wave. The refresh logic 118 may issue a read request over the request line 48 for the encrypted data 52 at the address A and determine it is successfully authenticated. For example, the encrypted data 52 may be read, decrypted using an appropriate initialization vector (e.g., based on A, GC, TS, K_id, etc.) and/or a key (e.g., Ka, etc.) and authenticated using the modified authentication code 64. The refresh logic 118 then allows for the valid decrypted data to be refreshed. For example, decrypted plaintext may be re-encrypted to generate updated ciphertext and an associated updated modified authentication code based on a re-generated (fresh) initialization value (e.g., for the address A, a current nonce value such as a current GC, a new TS value, the K_id, etc.). In the illustrated example, a new TS value (e.g., TS_new) for the re-generated (fresh) initialization value may be determined from a TS register 122 in the memory controller 44. Refresh logic 118 may then issue a write request to store the updated ciphertext and the associated updated modified authentication code at the address A of the memory 46.

Figure 6:
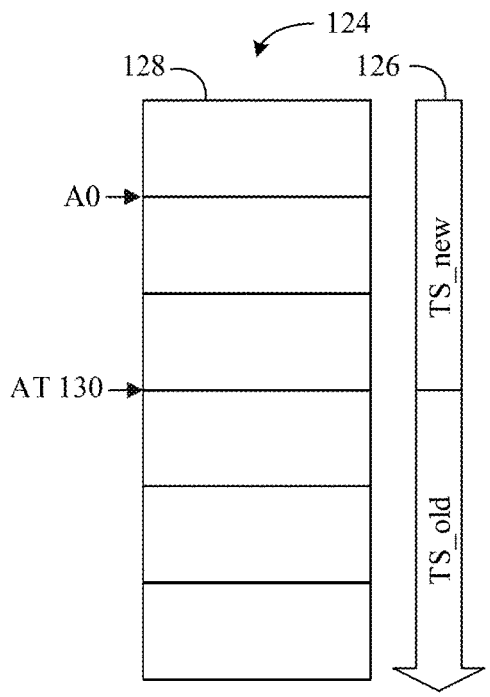
FIG. 6 is a block diagram of an example of data freshness according to an embodiment.

As shown in FIG. 6, data freshness 124 illustrates that data may be considered fresh (or T-fresh when a TS value is used) if it was written and/or updated not longer that T clock cycles ago, wherein T is a maximum time for completing one run/pass of a refresh wave 126 through an entire memory space of memory 128. Generally, data T-freshness is maintained with an update of an initialization value and/or a modified authentication code via the refreshing wave 126 that continuously runs through all of the data in the memory 128 with freshness checks and re-encryption.

In the illustrated example, a sequence of TS values are generated such that a TS value is incremented each complete pass through the memory 128. At each pass, the last two TS values are in use. For example, TS_old is used for data in the memory 128 below an AT 130 at the front of the refresh wave 126 and TS_new (e.g., TS_old=TS_old+1) is used above the AT 130 at the front of the refresh wave 126. Notably, a memory controller may also keep two global counters (e.g., GC_old and GC_new) to be used respectively with TS_old and TS_new. Thus, GC_old may be set to GC_new (GC=GC_new) and reset (e.g., GC_new=0) when the refresh wave 126 reaches the bottom of the memory address space in the memory 128 and moves back to the top of the memory address space in the memory 128. Thus, cryptographic strength of the modified authentication code may be maximized while a number of bits in a counter are reduced.

In the illustrated example, data at addresses 0 (A0) to AT 130 in the memory 128 are refreshed/updated and protected with TS_new whereas the rest of the data are protected with TS_old. In the illustrated example, the front of the refresh wave 126 moves at a pre-defined speed, relocating and/or shifting to a memory address below. A memory controller may, for example, issue a move instruction for every hundred regular read/write operations with user data. Data freshness is implemented in the background by reading data at AT 130, decrypting the data using an old initialization vector (address A, previous GC, TS_old, K_id) and/or a key (e.g., Ka), checking the modified authentication code, re-generating a "fresh" initialization vector (e.g., for the given address A, a current GC, TS_new, K_id), re-encrypting using a key (e.g., Ka), and writing back the re-encrypted CL and updated modified authentication code to the memory 128 at address A. The AT is incremented until is reaches a maximum value indicating all data in the memory 128 is encrypted using TS_new. With the next move to the top of the memory 128, TS_new become TS_old and a new TS_new is generated. GC_old become GC_new and GC_new=0. If there are multiple users/threads/channels supported by a memory controller with a separate K_id, each may have its own sequence of keys, TS, and counters while sharing an AT.

To speed up wave movement, and/or to improve the relative security strength of data freshness (T-freshness), known unused regions of the memory 128 may be skipped. In addition, time T may be decreased by speeding up the freshness refresh wave 126. In one example, a fraction of time assigned for background wave processing may be increased. Moreover, T-freshness may be checked during both regular reads and refreshing along the moving front of the refresh wave 126. If a problem is detected, it may be immediately reported during regular reads. For refreshing along the moving front of the refresh wave 126, a false alarm may be caused by not-yet-used memory locations in the memory 128 (e.g., unallocated part of memory). In this regard, artificial data may be written to a "suspicious" location that cannot be detected during data freshness. Thus, results of an integrity check (pass or not) are preserved until the data stored at the "suspicious" location actually needs to be used. For example, the data may be marked by K_id=0 (a special value, not assigned to any user) in multi-user architectures.

Figure 7:
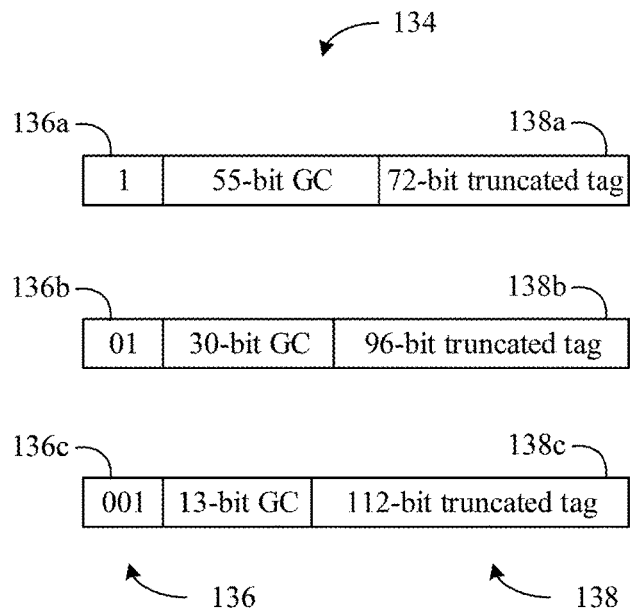
FIG. 7 is a block diagram of an example of prefix coding according to an embodiment.

Referring back to FIG. 3, a counter size and/or counter growth may be managed. Notably, fewer bits in a counter results in fewer bits for a nonce value conveyed in a modified authentication code and more bits for an authentication value in the modified authentication code. In the illustrated example, prefix code logic 132 generates a prefix code for the modified authentication code that distinguishes sizes of fields allocated to a value (e.g., a nonce value) and/or allocated to an authentication value in a modified authentication code. As shown in FIG. 7, prefix coding 134 includes a prefix code 136 (136a-136c) associated with a modified authentication code 138 (138a-138c). For example, prefix code 136a indicates that modified authentication code 138a includes a 55-bit wide first field for a nonce value and/or a 75-bit wide second field for an authentication value. Similarly, prefix codes 136b, 136c indicate that modified authentication codes 138b, 138c include respective first fields that are 30-bits wide and 13-bits wide, etc. Thus, counters of varying size may be used to also tailor AE strength.

Figure 8:
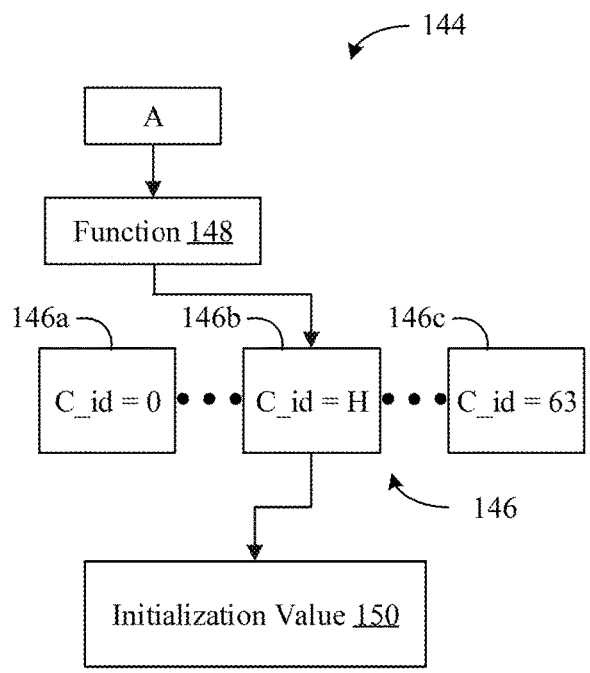
FIG. 8 is a block diagram of an example of an array counter approach according to an embodiment.

Referring back to FIG. 3, array counter logic 140 generates an array of group counters mapped to respective address groups from a memory address space. Notably, inclusion of a memory address in an initialization value (e.g., initialization vector, etc.) makes it unique. Thus, all memory addresses within a memory device may be divided into groups to handle a relatively smaller group counter for each group and/or to make initialization values distinguishable for memory addresses of a same group. As shown in FIG. 8, array counter approach 144 generates and/or utilizes an array of counters 146 (146a-146c). In the illustrated example, 64 different counters are instantiated and assigned a corresponding 6-bit group counter identifier (C_id). For a given address (e.g., address A) in a write operation, a hash is computed at function 148 to identify an appropriate group counter (e.g., C_id=H) that provides a counter value. Notably, 6 bits can be saved in the illustrated example. The counter value is allocated for an initialization value 150 and the counter of the group counter (C_id=H) is incremented for a next write operation involving an address associated with that group counter.

Referring back to FIG. 3, reset logic 152 resets a counter based on an arrival of a refresh wave at an end of a memory address space. A refresh wave that traverses a memory space, to re-fresh the data stored in a memory device, arrives at the end of the memory space when all of the data in the memory device is encrypted using a new TS value. The reset logic 152 resets a counter with the next move of the refresh wave back to the top of the memory address space. Thus, a number of bits needed in the counter are minimized. Moreover, virtual value logic 154 generates a virtual value from a virtual counter to minimize the growth of a counter. In one example, buffering of write requests by the virtual value logic 154 may reduce counter growth and consequently a number of bits (e.g., 6 bits, etc.) to store a counter value in an initialization value (e.g., vector, etc.).

Figure 9:
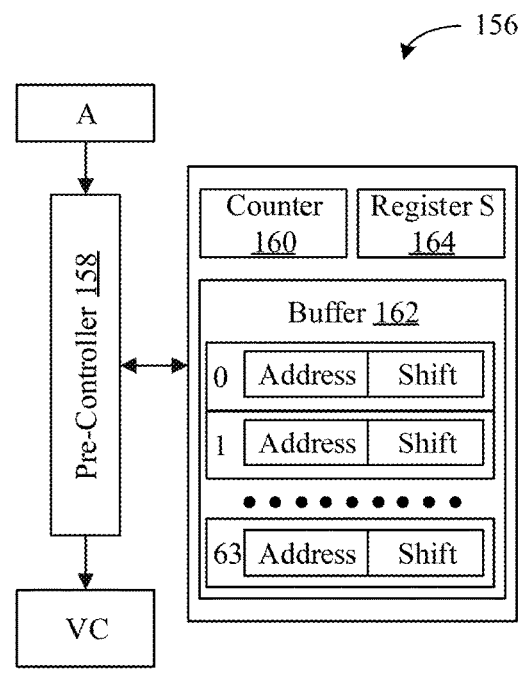
FIG. 9 is a block diagram of an example of a buffering approach according to an embodiment.
Figure 10A:
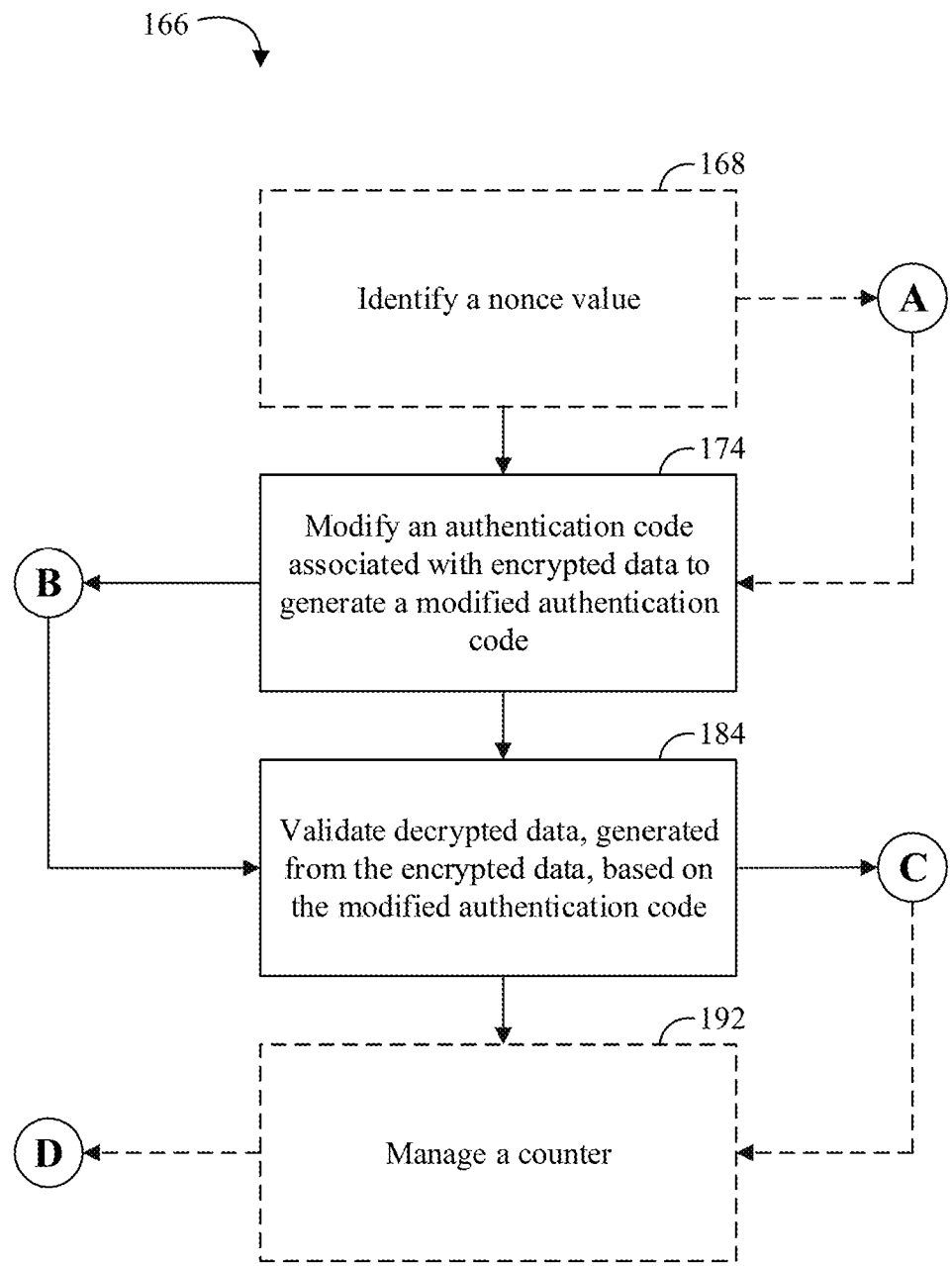
FIGS. 10A to 10E are block diagrams of an example of a method according to an embodiment.
Figure 10B:
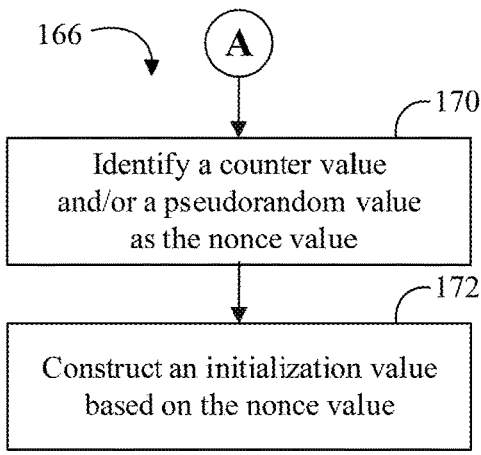
Figure 10D:
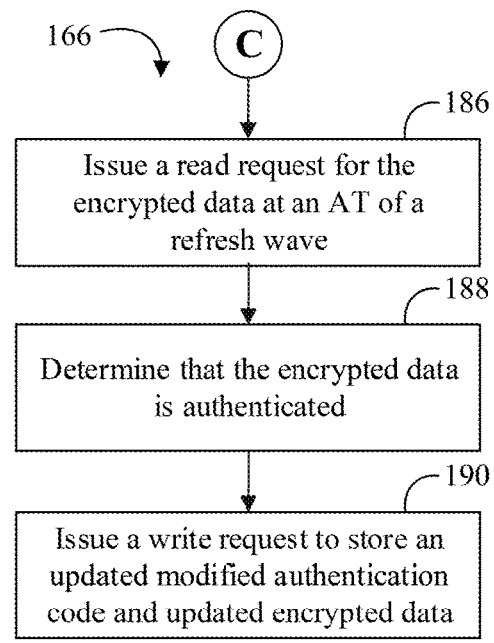
Figure 10C:
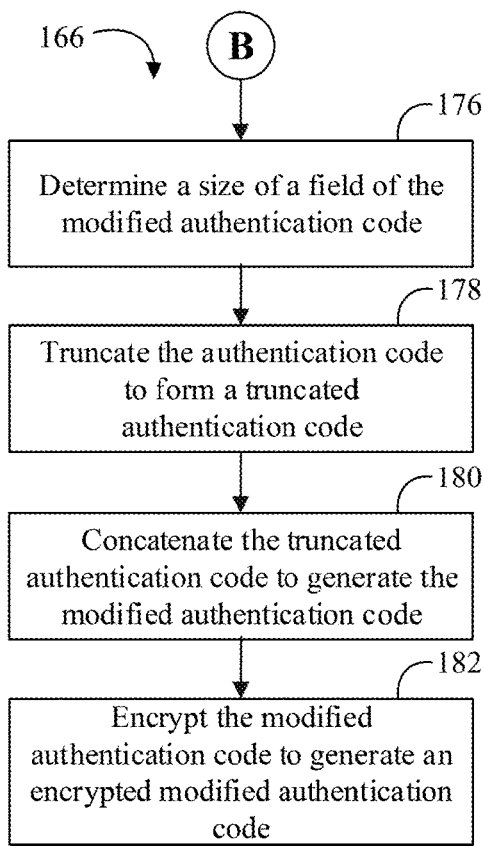
Figure 10E:
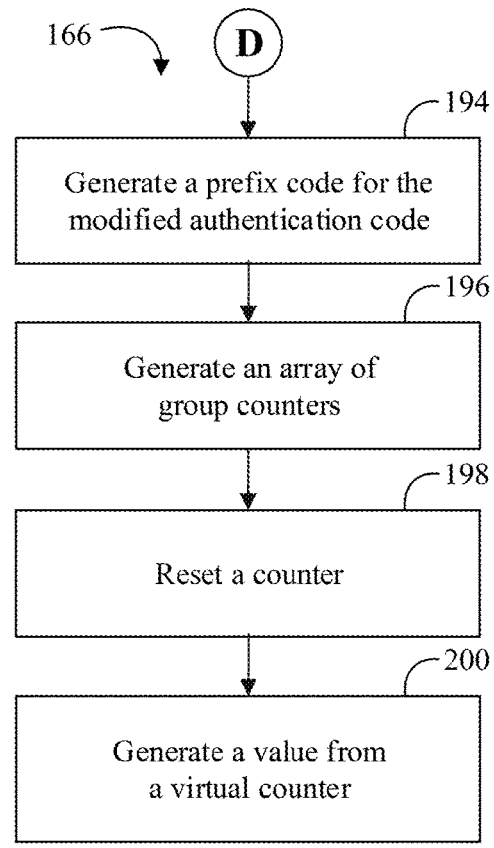

As shown in FIG. 9, buffering approach 156 to reduce a size of a counter illustrates that a pre-controller 158 receives a write request for a given address (e.g., address A) and buffers the write request using a counter 160, an array buffer 162 (BUF[64]), and a register (S) 164 for a number of current records in the array buffer 162 ({address, shift}). As shown in the example pseudocode below, a value (VC) of a virtual counter is generated for an initialization value (e.g., initialization vector) when writing to the address (e.g., A). Notably, the pseudocode may be modified into a caching process capable to reduce counter growth for all user scenarios (for all write patterns) with enough on-chip memory to store CL (user data) of the records in the array buffer.

```
Find index i (0 ≤ i < S) such that BUF[i].address = A
If found:
    BUF[i].shift++
    return value VC = GC + BUF[i].shift
Else:
    if S == 64 /* i.e. buffer is full */
        /* update the buffer: remove entries with smallest shifts, and
        increase GC as follows */
            limit = 1 + min_(i, 0 ≤ i < S) BUF[i].shift
            remove all entries such that BUF[i].shift < limit /*
            after this step, S < 64 */
            GC += limit
            for i = 0 ... S-1, do BUF[i].shift -= limit
    /* now in all cases S < 64 */
    BUF[S++] = { A, 0 }
    return value VC = GC
```

While examples have provided various components of the system 10, the apparatus 34, and/or the system 40 for illustration purposes, it should be understood that one or more components thereof may reside in the same and/or different physical and/or virtual locations, may be combined, omitted, bypassed, re-arranged, and/or be utilized in any order. For example, the processor 14 may implement one or more components of the memory controller 16, the logic 32, the logic 38, the logic 42, the memory controller 44, and so on. Moreover, any or all components thereof may be automatically implemented (e.g., without human intervention, etc.).

Turning now to FIGS. 10A to 10E, a method 166 is shown to protect memory data according to embodiments. The method 166 may be implemented by, for example, any or all components of system 10 (FIG. 1), the apparatus 34 (FIG. 2), and/or the system 40 (FIG. 3), discussed above. The method 166 may be implemented as a set of logic instructions stored in a machine- or computer-readable storage medium such as RAM, ROM, PROM, firmware, flash memory, 3DXP memory, etc., in configurable logic such as, for example, PLAs, FPGAs, CPLDs, or any combination thereof, in fixed-functionality logic such as ASICs, CMOS, TTL, and/or other fixed functionality technology. For example, computer program code to carry out operations shown in the method 166 may be written in any combination of one or more programming languages, including an object oriented programming language such as JAVA, SMALLTALK, C++ or the like and traditional procedural programming languages, such as the "C" programming language or similar programming languages.

Embodiments or portions of the method 166 may be implemented in firmware, applications (e.g., through an application programming interface (API)), or driver software running on an OS. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, CPU, microcontroller, etc.).

In the illustrated example, block 168 optionally identifies a nonce value generated for a particular write to a memory device. Block 170, for example, identifies a counter value and/or a pseudorandom value as the nonce value. In addition, block 172 constructs an initialization value based on the nonce value. For example, block 172 may construct an initialization value (e.g., IV, IS, etc.) based on the nonce value (e.g., a counter value, a pseudorandom) and a memory address for encrypted data that is to be stored in memory, a K_id (or an SA_id), and/or or a most recent TS value. The initialization value may be used to generate encrypted data from unencrypted data. In one example, the encrypted data may be generated with an AE key based on the memory address, a private key, and a most recent TS value. The initialization value may, for example, be encrypted with the AE key and the result may be XOR'ed with the unencrypted data to generate the encrypted data used to calculate an authentication code.

Block 174 modifies an authentication code associated with encrypted data to generate a modified authentication code. The encrypted data and the modified authentication code may then be stored in memory. Block 176, for example, determines a size of a field of the modified authentication code. For example, block 176 may determine a size of a first field for the nonce value in the modified authentication code and/or a size of a second field for an authentication value in the modified authentication code. Block 178 truncates the authentication code to form a truncated authentication code. For example, block 178 may truncate the authentication code to the size of the second field to form the truncated authentication code. Block 180 concatenates the truncated authentication code to generate the modified authentication code. For example, block 180 may concatenate the truncated authentication code with the nonce value to generate the modified authentication code. Block 182 further encrypts the modified authentication code to generate an encrypted modified authentication code. For example, block 182 may utilize a fixed key, a rotation key (e.g., a random number), an AE key, etc.

Block 184 validates decrypted data, generated from the encrypted data, based on the modified authentication code. For example, the encrypted data may be read from the memory together with an associated modified authentication code and decrypted to form the decrypted data. The encrypted data may also be processed to generate a new authentication code that is compared to the read modified authentication code to validate the decrypted data and/or to authenticate the stored encrypted data. Where data freshness is implemented, block 186 issues a read request for the encrypted data at an AT of a refresh wave. Block 188 determines that the encrypted data is authenticated. For example, block 188 confirms a match condition exists between a new authentication code generated on decryption and the modified authentication code stored in the memory that was generated on encryption. If not, a security action may automatically be implemented. If so, an updated modified authentication code is generated with updated encrypted data. Thus, block 190 issues a write request to store the updated modified authentication code and the updated encrypted data in the same or different memory.

Block 192 optionally manages a counter. In one example, block 194 generates a prefix code for the modified authentication code. In addition, block 196 generates an array of group counters. For example, an array of group counters may be mapped to respective address groups from a memory address space in the memory. Moreover, block 198 resets a counter. Block 198 may reset a counter based on an arrival of a refresh wave at an end of the memory address space in the memory. Also, block 200 generates a value from a virtual counter. For example, block 200 may use a buffer to buffer a write request. Thus, counter size and/or counter growth may be minimized.

While independent blocks and/or a particular order has been shown for illustration purposes, it should be understood that one or more of the blocks of the method 166 may be combined, omitted, bypassed, re-arranged, and/or flow in any order. Moreover, any or all blocks of the method 166 may be automatically implemented (e.g., without human intervention, etc.).

Figure 11:
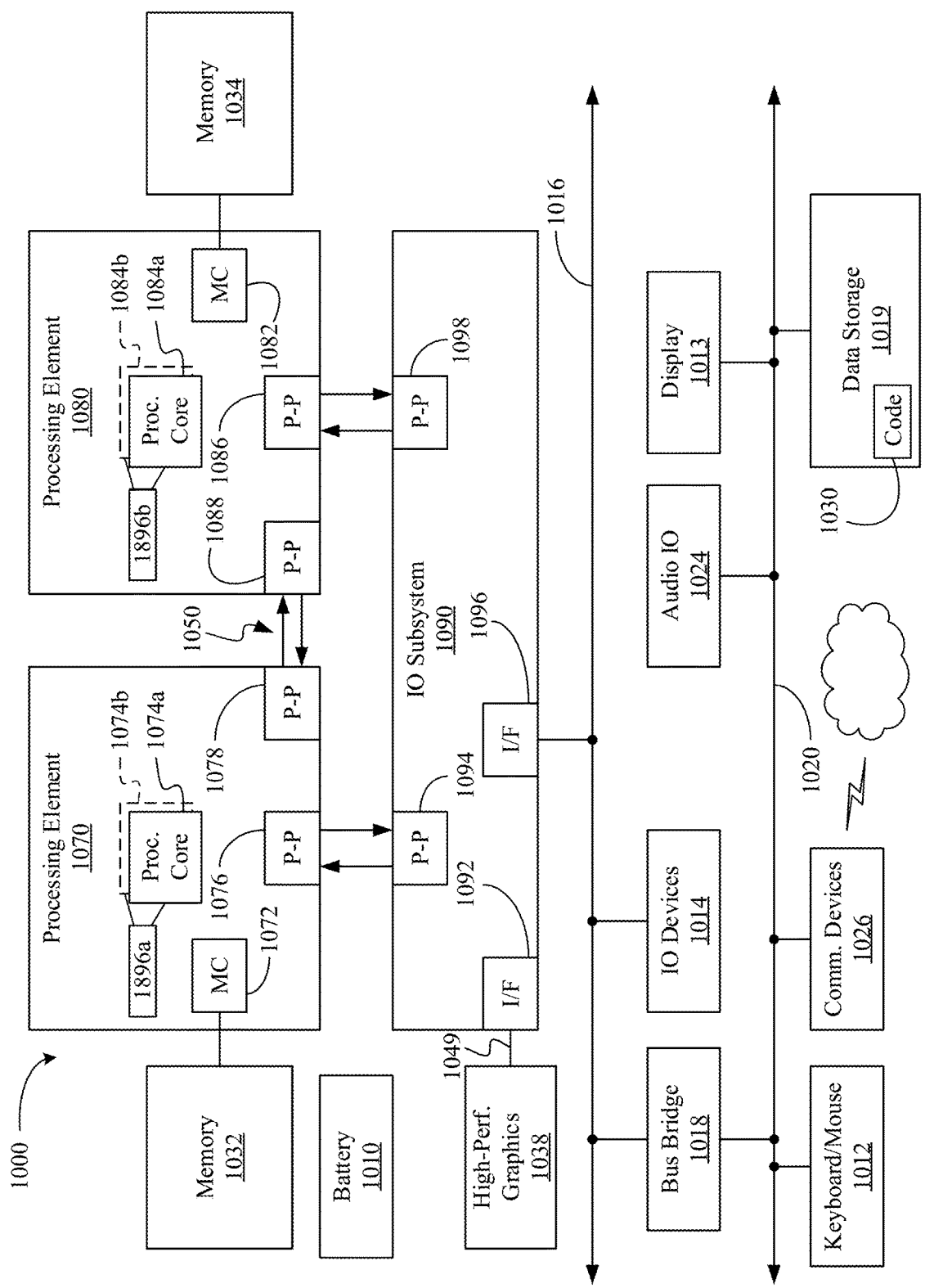
FIG. 11 is a block diagram of an example of a computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 1.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., cameras, sensors, etc.) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), a display 1013 (e.g., touch screen), and a data storage unit 1019 such as a disk drive or other mass storage device which may include code 1030, in one embodiment. The illustrated code 1030 may implement one or more aspects of the system 10 (FIG. 1), the apparatus 34 (FIG. 2), the system 40 (FIG. 3), the initialization values 74, 76, 80 (FIGS. 4A to 4C), the AE 90 (FIGS. 5A to 5B), the data freshness 124 (FIG. 6), the prefix coding 134 (FIG. 7), the array counter approach 144 (FIG. 8), the buffering approach 156 (FIG. 9), and/or the method 166 (FIGS. 10A to 10E). Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

ADDITIONAL NOTES AND EXAMPLES

Example 1 may include an electronic processing system to provide memory data protection comprising a processor, and logic communicatively coupled to the processor to modify an authentication code associated with encrypted data to generate a modified authentication code, wherein at least the encrypted data is to be stored in memory, and validate decrypted data, to be generated from the encrypted data, based on the modified authentication code.

Example 2 may include the system of Example 1, further including logic to construct an initialization value based on a nonce value and one or more of a memory address for the encrypted data, a key identifier for a key used to generate the encrypted data, or a most recent timestamp value from a running sequence of timestamp values.

Example 3 may include the system of any one of Examples 1 to 2, wherein the logic is further to identify one of a counter value or a pseudorandom value as the nonce value, and construct the initialization value based on the memory address, the key identifier, the timestamp value, and one of the counter value or the pseudorandom value.

Example 4 may include the system of any one of Examples 1 to 3, wherein the logic is further to determine one or more of a size of a first field for a nonce value in the modified authentication code or a size of a second field for an authentication value in the modified authentication code, truncate the authentication code to the size of the second field to form a truncated authentication code, and concatenate the truncated authentication code with the nonce value to generate the modified authentication code.

Example 5 may include the system of any one of Examples 1 to 4, further including logic to encrypt the modified authentication code to generate an encrypted modified authentication code, and logic to generate an authenticated encryption key based on two or more of a memory address for the encrypted data, a key used to generate the encrypted data, or a most recent timestamp value from a running sequence of timestamp values.

Example 6 may include the system of any one of Examples 1 to 5, further including logic to issue a read request for the encrypted data at an address threshold of a refresh wave, determine that the encrypted data is authenticated to allow for an updated modified authentication code to be generated, and issue a write request to store the updated modified authentication code in the memory.

Example 7 may include the system of any one of Examples 1 to 6, further including one or more of logic to generate a prefix code for the modified authentication code, logic to generate an array of group counters mapped to respective address groups from a memory address space in the memory, logic to reset a counter based on an arrival of a refresh wave at an end of the memory address space in the memory, or logic to generate a value from a virtual counter.

Example 8 may include a semiconductor package apparatus to provide memory data protection comprising one or more substrates, and logic coupled to the one or more substrates, wherein the logic is at least partly implemented in one or more of configurable logic or fixed-functionality hardware logic, the logic coupled to the one or more substrates to modify an authentication code associated with encrypted data to generate a modified authentication code, wherein at least the encrypted data is to be stored in memory, and validate decrypted data, to be generated from the encrypted data, based on the modified authentication code.

Example 9 may include the apparatus of Example 8, further including logic to construct an initialization value based on a nonce value and one or more of a memory address for the encrypted data, a key identifier for a key used to generate the encrypted data, or a most recent timestamp value from a running sequence of timestamp values.

Example 10 may include the apparatus of any one of Examples 8 to 9, wherein the logic is further to identify one of a counter value or a pseudorandom value as the nonce value, and construct the initialization value based on the memory address, the key identifier, the timestamp value, and one of the counter value or the pseudorandom value.

Example 11 may include the apparatus of any one of Examples 8 to 10, wherein the logic is further to determine one or more of a size of a first field for a nonce value in the modified authentication code or a size of a second field for an authentication value in the modified authentication code, truncate the authentication code to the size of the second field to form a truncated authentication code, and concatenate the truncated authentication code with the nonce value to generate the modified authentication code.

Example 12 may include the apparatus of any one of Examples 8 to 11, further including logic to encrypt the modified authentication code to generate an encrypted modified authentication code, and logic to generate an authenticated encryption key based on two or more of a memory address for the encrypted data, a key used to generate the encrypted data, or a most recent timestamp value from a running sequence of timestamp values.

Example 13 may include the apparatus of any one of Examples 8 to 12, further including logic to issue a read request for the encrypted data at an address threshold of a refresh wave, determine that the encrypted data is authenticated to allow for an updated modified authentication code to be generated, and issue a write request to store the updated modified authentication code in the memory.

Example 14 may include the apparatus of any one of Examples 8 to 13, further including one or more of logic to generate a prefix code for the modified authentication code, logic to generate an array of group counters mapped to respective address groups from a memory address space in the memory, logic to reset a counter based on an arrival of a refresh wave at an end of the memory address space in the memory, or logic to generate a value from a virtual counter.

Example 15 may include a method to provide memory data protection comprising modifying an authentication code associated with encrypted data to generate a modified authentication code, wherein at least the encrypted data is stored in memory, and validating decrypted data, generated from the encrypted data, based on the modified authentication code.

Example 16 may include the method of Example 15, further including constructing an initialization value based on a nonce value and one or more of a memory address for the encrypted data, a key identifier for a key used to generate the encrypted data, or a most recent timestamp value from a running sequence of timestamp values.

Example 17 may include the method of any one of Examples 15 to 16, further including identifying one of a counter value or a pseudorandom value as the nonce value, and constructing the initialization value based on the memory address, the key identifier, the timestamp value, and one of the counter value or the pseudorandom value.

Example 18 may include the method of any one of Examples 15 to 17, further including determining one or more of a size of a first field for a nonce value in the modified authentication code or a size of a second field for an authentication value in the modified authentication code, truncating the authentication code to the size of the second field to form a truncated authentication code, and concatenating the truncated authentication code with the nonce value to generate the modified authentication code.

Example 19 may include the method of any one of Examples 15 to 18, further including encrypting the modified authentication code to generate an encrypted modified authentication code, and generating an authenticated encryption key based on two or more of a memory address for the encrypted data, a key used to generate the encrypted data, or a most recent timestamp value from a running sequence of timestamp values.

Example 20 may include the method of any one of Examples 15 to 19, further including issuing a read request for the encrypted data at an address threshold of a refresh wave, determining that the encrypted data is authenticated to allow for an updated modified authentication code to be generated, and issuing a write request to store the updated modified authentication code in the memory.

Example 21 may include the method of any one of Examples 15 to 20, further including one or more of generating a prefix code for the modified authentication code, generating an array of group counters mapped to respective address groups from a memory address space in the memory, resetting a counter based on an arrival of a refresh wave at an end of the memory address space in the memory, or generating a value from a virtual counter.

Example 22 may include at least one computer readable storage medium comprising a set of instructions, which when executed by a computing device, cause the computing device to modify an authentication code associated with encrypted data to generate a modified authentication code, wherein at least the encrypted data is to be stored in memory, and validate decrypted data, to be generated from the encrypted data, based on the modified authentication code.

Example 23 may include the at least one computer readable storage medium of Example 22, wherein the instructions, when executed, cause the computing device to construct an initialization value based on a nonce value and one or more of a memory address for the encrypted data, a key identifier for a key used to generate the encrypted data, or a most recent timestamp value from a running sequence of timestamp values.

Example 24 may include the at least one computer readable storage medium of any one of Examples 22 to 23, wherein the instructions, when executed, cause the computing device to identify one of a counter value or a pseudorandom value as the nonce value, and construct the initialization value based on the memory address, the key identifier, the timestamp value, and one of the counter value or the pseudorandom value.

Example 25 may include the at least one computer readable storage medium of any one of Examples 22 to 24, wherein the instructions, when executed, cause the computing device to determine one or more of a size of a first field for a nonce value in the modified authentication code or a size of a second field for an authentication value in the modified authentication code, truncate the authentication code to the size of the second field to form a truncated authentication code, and concatenate the truncated authentication code with the nonce value to generate the modified authentication code.

Example 26 may include the at least one computer readable storage medium of any one of Examples 22 to 25, wherein the instructions, when executed, cause the computing device to encrypt the modified authentication code to generate an encrypted modified authentication code, and generate an authenticated encryption key based on two or more of a memory address for the encrypted data, a key used to generate the encrypted data, or a most recent timestamp value from a running sequence of timestamp values.

Example 27 may include the at least one computer readable storage medium of any one of Examples 22 to 26, wherein the instructions, when executed, cause the computing device to issue a read request for the encrypted data at an address threshold of a refresh wave, determine that the encrypted data is authenticated to allow for an updated modified authentication code to be generated, and issue a write request to store the updated modified authentication code in the memory.

Example 28 may include the at least one computer readable storage medium of any one of Examples 22 to 27, wherein the instructions, when executed, cause the computing device to one or more of generate a prefix code for the modified authentication code, generate an array of group counters mapped to respective address groups from a memory address space in the memory, reset a counter based on an arrival of a refresh wave at an end of the memory address space in the memory, or generate a value from a virtual counter.

Example 29 may include an apparatus to provide memory data protection comprising means for performing the method of any one of Examples 15 to 21.

Thus, techniques described herein may provide for the security of embedded computing systems, and more particularly may provide off-chip memory data protection via a relatively low cost and/or cryptographically strong technology. For example, embodiments may provide relatively lightweight technology to provide integrity protection and/or data freshness control (e.g., to mitigate replay attacks, etc.) via AE modes of crypto processes such as, for example, AES-GCM, AEAD_CHACHA20_POLY1305, Sponge functions (e.g., duplex mode, etc.), and so on. Embodiments may address security issues for relatively highly constrained systems (e.g., off-chip memory in embedded systems, storage servers, datacenters, etc.).

Embodiments may also provide data confidentiality and/or data integrity together with relatively low memory overhead and/or bandwidth, latency cost, and/or power consumption (e.g., relatively low chip power consumption). For example, embodiments may provide confidentiality, cryptographically strong integrity, memory data freshness (e.g., T-freshness) and/or anti-rollback control, minimize off-chip overhead, bandwidth degradation and/or unwanted latency increase, provide relatively efficient implementation without relatively large impact in memory controller hardware (e.g., no complex cache handling flow in a memory controller, client side cryptography for RDMA, etc.), leverage cryptographic processes, provide data-at-rest and data-in-use protection, and so on.

In one example, a global counter is used that counts a number of write operations addressed to off-chip memory. Each newly written portion of data is authenticated using a most recent value of the counter, which is saved for validation during a read operation. The counter value may be conveyed by, for example, borrowing bits originally reserved for an authentication tag (e.g., a 128-bit authentication tag produced via AE) stored and used in validation. Moreover, a truncated authentication tag is concatenated with the counter value (e.g., combined, they fit back into a 128-bit field reserved originally to store the authentication tag). Additionally a same off-chip memory may store both data block/sector of a size (e.g., 512 bytes, 4 kilobytes, etc.) and the authentication tag, wherein a memory controller may process them both. In addition, embodiments may minimize a size of the counter (e.g., number of bits) and/or a growth of the counter (e.g., maximize size of a truncated tag). For example, embodiments may utilize prefix coding, an array of counters, buffering to reduce growth, constantly/iteratively running counter refreshing, and so on.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system comprising:
  a processor; and
  logic communicatively coupled to the processor to:
    modify an authentication code associated with encrypted data to generate a modified authentication code, wherein the modified authentication code is to be based on a new value generated specifically for a corresponding write of data to memory to provide data freshness control including iterative authentication and re-encryption based on a timestamp value, wherein the iterative authentication and re-encryption are to provide data time freshness via a refreshing wave that continuously traverses the memory at a pre-defined pace, and wherein the modified authentication code and the encrypted data are to be stored in memory, and validate decrypted data, to be generated from the encrypted data, based on the modified authentication code, to determine whether a match condition exists between a new authentication code generated on decryption and the modified authentication code stored in the memory, wherein validating the decrypted data includes:
when a match condition exists, confirming the match, and
when a match does not exist, automatically issuing a security action including generating an updated modified authentication code with updated encrypted data, and issuing a write request to store the updated modified authentication code and the updated encrypted data in the memory.

2. The system of claim 1, further including logic to construct an initialization value based on a nonce value and one or more of a memory address for the encrypted data, a key identifier for a key used to generate the encrypted data, or a most recent timestamp value from a running sequence of timestamp values.

3. The system of claim 2, wherein the logic is further to:
identify one of a counter value or a pseudorandom value as the nonce value; and
construct the initialization value based on the memory address, the key identifier, the timestamp value, and one of the counter value or the pseudorandom value.

4. The system of claim 1, wherein the logic is further to:
determine one or more of a size of a first field for a nonce value in the modified authentication code or a size of a second field for an authentication value in the modified authentication code;
truncate the authentication code to the size of the second field to form a truncated authentication code; and
concatenate the truncated authentication code with the nonce value to generate the modified authentication code.

5. The system of claim 1, further including:
logic to encrypt the modified authentication code to generate an encrypted modified authentication code; and
logic to generate an authenticated encryption key based on two or more of a memory address for the encrypted data, a key used to generate the encrypted data, or a most recent timestamp value from a running sequence of timestamp values.

6. The system of claim 1, further including logic to:
issue a read request for the encrypted data at an address threshold of a refresh wave;
determine that the encrypted data is authenticated to allow for an updated modified authentication code to be generated; and
issue a write request to store the updated modified authentication code in the memory.

7. The system of claim 1, further including one or more of:
logic to generate a prefix code for the modified authentication code;
logic to generate an array of group counters mapped to respective address groups from a memory address space in the memory;
logic to reset a counter based on an arrival of a refresh wave at an end of the memory address space in the memory; or
logic to generate a value from a virtual counter.

8. A semiconductor package apparatus comprising:
one or more substrates; and
logic coupled to the one or more substrates, wherein the logic is at least partly implemented in one or more of configurable logic or fixed-functionality hardware logic, the logic coupled to the one or more substrates to:
modify an authentication code associated with encrypted data to generate a modified authentication code, wherein the modified authentication code is to be based on a new value generated specifically for a corresponding write of data to memory to provide data freshness control including iterative authentication and re-encryption based on a timestamp value, wherein the iterative authentication and re-encryption are to provide data time freshness via a refreshing wave that continuously traverses the memory at a pre-defined pace, and wherein the modified authentication code and the encrypted data are to be stored in memory, and validate decrypted data, to be generated from the encrypted data, based on the modified authentication code, to determine whether a match condition exists between a new authentication code generated on decryption and the modified authentication code stored in the memory, wherein validating the decrypted data includes:
when a match condition exists, confirming the match, and
when a match does not exist, automatically issuing a security action including generating an updated modified authentication code with updated encrypted data, and issuing a write request to store the updated modified authentication code and the updated encrypted data in the memory.

9. The apparatus of claim 8, further including logic to construct an initialization value based on a nonce value and one or more of a memory address for the encrypted data, a key identifier for a key used to generate the encrypted data, or a most recent timestamp value from a running sequence of timestamp values.

10. The apparatus of claim 8, wherein the logic is further to:
determine one or more of a size of a first field for a nonce value in the modified authentication code or a size of a second field for an authentication value in the modified authentication code;
truncate the authentication code to the size of the second field to form a truncated authentication code; and
concatenate the truncated authentication code with the nonce value to generate the modified authentication code.

11. The apparatus of claim 8, further including:
logic to encrypt the modified authentication code to generate an encrypted modified authentication code; and
logic to generate an authenticated encryption key based on two or more of a memory address for the encrypted data, a key used to generate the encrypted data, or a most recent timestamp value from a running sequence of timestamp values.

12. The apparatus of claim 8, further including logic is to:
issue a read request for the encrypted data at an address threshold of a refresh wave;
determine that the encrypted data is authenticated to allow for an updated modified authentication code to be generated; and issue a write request to store the updated modified authentication code in the memory.

13. The apparatus of claim 8, further including one or more of:
   logic to generate a prefix code for the modified authentication code;
   logic to generate an array of group counters mapped to respective address groups from a memory address space in the memory;
   logic to reset a counter based on an arrival of a refresh wave at an end of the memory address space in the memory; or
   logic to generate a value from a virtual counter.

14. A method comprising:
   modifying an authentication code associated with encrypted data to generate a modified authentication code, wherein the modified authentication code is to be based on a new value generated specifically for a corresponding write of data to memory to provide data freshness control including iterative authentication and re-encryption based on a timestamp value, wherein the iterative authentication and re-encryption are to provide data time freshness via a refreshing wave that continuously traverses the memory at a pre-defined pace, and wherein the modified authentication code and the encrypted data are to be stored in memory; and
   validating decrypted data, generated from the encrypted data, based on the modified authentication code, to determine whether a match condition exists between a new authentication code generated on decryption and the modified authentication code stored in the memory, wherein validating the decrypted data includes:
      when a match condition exists, confirming the match, and
      when a match does not exist, automatically issuing a security action including generating an updated modified authentication code with updated encrypted data, and issuing a write request to store the updated modified authentication code and the updated encrypted data in the memory.

15. The method of claim 14, further including constructing an initialization value based on a nonce value and one or more of a memory address for the encrypted data, a key identifier for a key used to generate the encrypted data, or a most recent timestamp value from a running sequence of timestamp values.

16. The method of claim 14, further including:
   determining one or more of a size of a first field for a nonce value in the modified authentication code or a size of a second field for an authentication value in the modified authentication code;
   truncating the authentication code to the size of the second field to form a truncated authentication code; and
   concatenating the truncated authentication code with the nonce value to generate the modified authentication code.

17. The method of claim 14, further including:
   encrypting the modified authentication code to generate an encrypted modified authentication code; and
   generating an authenticated encryption key based on two or more of a memory address for the encrypted data, a key used to generate the encrypted data, or a most recent timestamp value from a running sequence of timestamp values.

18. The method of claim 14, further including:
   issuing a read request for the encrypted data at an address threshold of a refresh wave;
   determining that the encrypted data is authenticated to allow for an updated modified authentication code to be generated; and
   issuing a write request to store the updated modified authentication code in the memory.

19. The method of claim 14, further including one or more of:
   generating a prefix code for the modified authentication code;
   generating an array of group counters mapped to respective address groups from a memory address space in the memory;
   resetting a counter based on an arrival of a refresh wave at an end of the memory address space in the memory; or
   generating a value from a virtual counter.

20. At least one non-transitory computer readable storage medium comprising a set of instructions, which when executed by a computing device, cause the computing device to:
   modify an authentication code associated with encrypted data to generate a modified authentication code, wherein the modified authentication code is to be based on a new value generated specifically for a corresponding write of data to memory to provide data freshness control including iterative authentication and re-encryption based on a timestamp value, wherein the iterative authentication and re-encryption are to provide data time freshness via a refreshing wave that continuously traverses the memory at a pre-defined pace, wherein at least the encrypted data is to be stored in memory; and
   validate decrypted data, to be generated from the encrypted data, based on the modified authentication code, to determine whether a match condition exists between a new authentication code generated on decryption and the modified authentication code stored in the memory, wherein validating the decrypted data includes:
      when a match condition exists, confirming the match, and
      when a match does not exist, automatically issuing a security action including generating an updated modified authentication code with updated encrypted data, and issuing a write request to store the updated modified authentication code and the updated encrypted data in the memory.

21. The at least one non-transitory computer readable storage medium of claim 20, wherein the instructions, when executed, cause the computing device to construct an initialization value based on a nonce value and one or more of a memory address for the encrypted data, a key identifier for a key used to generate the encrypted data, or a most recent timestamp value from a running sequence of timestamp values.

22. The at least one non-transitory computer readable storage medium of claim 20, wherein the instructions, when executed, cause the computing device to:
   determine one or more of a size of a first field for a nonce value in the modified authentication code or a size of a second field for an authentication value in the modified authentication code;
   truncate the authentication code to the size of the second field to form a truncated authentication code; and concatenate the truncated authentication code with the nonce value to generate the modified authentication code.

23. The at least one non-transitory computer readable storage medium of claim 20, wherein the instructions, when executed, cause the computing device to:
   encrypt the modified authentication code to generate an encrypted modified authentication code; and
   generate an authenticated encryption key based on two or more of a memory address for the encrypted data, a key used to generate the encrypted data, or a most recent timestamp value from a running sequence of timestamp values.

24. The at least one non-transitory computer readable storage medium of claim 20, wherein the instructions, when executed, cause the computing device to:
   issue a read request for the encrypted data at an address threshold of a refresh wave;
   determine that the encrypted data is authenticated to allow for an updated modified authentication code to be generated; and
   issue a write request to store the updated modified authentication code in the memory.

25. The at least one non-transitory computer readable storage medium of claim 20, wherein the instructions, when executed, cause the computing device to one or more of:
   generate a prefix code for the modified authentication code;
   generate an array of group counters mapped to respective address groups from a memory address space in the memory;
   reset a counter based on an arrival of a refresh wave at an end of the memory address space in the memory; or
   generate a value from a virtual counter.

* * * * *